United States Patent
Armstrong

(10) Patent No.: US 7,036,776 B1
(45) Date of Patent: May 2, 2006

(54) ICE CREAM CONE HOLDING APPARATUS

(76) Inventor: Jennifer Armstrong, 398 Riverdale Dr., Aberdeen, NJ (US) 07735

( * ) Notice: Subject to any disclaimer, the term of this patent is extended or adjusted under 35 U.S.C. 154(b) by 193 days.

(21) Appl. No.: 10/331,734

(22) Filed: Dec. 31, 2002

(51) Int. Cl.
B65D 25/00 (2006.01)

(52) U.S. Cl. .................. 248/157; 248/125.1; 248/311.3

(58) Field of Classification Search ................ 248/132, 248/125.1, 125.2, 125.9, 405, 415, 416, 176.3; 403/43, 48, 109.4
See application file for complete search history.

(56) References Cited

U.S. PATENT DOCUMENTS

| | | | | |
|---|---|---|---|---|
| 1,303,171 A | * | 5/1919 | Curtin | .......................... 248/146 |
| 2,228,942 A | * | 1/1941 | Balton | .......................... 426/139 |
| 2,266,001 A | * | 12/1941 | Christianson | ................ 248/132 |
| 2,356,874 A | | 8/1944 | Nageotte | |
| 2,362,595 A | * | 11/1944 | Torrison | ...................... 220/737 |
| 3,481,458 A | | 12/1969 | Mayeaux | |
| 3,488,538 A | * | 1/1970 | Hayashi | ........................ 310/220 |
| 4,226,355 A | * | 10/1980 | Helfrich, Jr. | ................. 248/146 |
| 4,639,376 A | * | 1/1987 | Saladino et al. | ............. 426/134 |
| 4,821,906 A | | 4/1989 | Clark | |
| 5,224,646 A | * | 7/1993 | Biancosino | ................... 229/4.5 |
| 5,577,692 A | * | 11/1996 | Rollins | ......................... 248/106 |
| 5,927,701 A | * | 7/1999 | Chapman | .................... 269/87.2 |
| 5,979,695 A | | 11/1999 | Valls et al. | |
| 6,048,014 A | * | 4/2000 | Stefanik | ..................... 294/99.1 |
| 6,050,585 A | * | 4/2000 | Rai | .......................... 280/288.4 |
| 6,532,863 B1 | * | 3/2003 | Lee | ............................... 99/348 |

* cited by examiner

Primary Examiner—Ramon O. Ramirez
Assistant Examiner—Steven Marsh

(57) ABSTRACT

An ice cream cone holding apparatus includes a housing including a base and a vertical portion that is attached to and extends upwardly from the base. An opening extends into an upper end of the vertical portion and through a bottom surface of the base. A saddle is positioned in the opening and is frictionally coupled to an inner surface of the opening to selectively position the saddle in the opening.

5 Claims, 2 Drawing Sheets

ICE CREAM CONE HOLDING APPARATUS

BACKGROUND OF THE INVENTION

1. Field of the Invention

The present invention relates to cone holders and more particularly pertains to a new cone holder for providing a user with a device for preventing drippings from falling on the person eating the ice cream cone or on a floor surface.

2. Description of the Prior Art

The use of cone holders is known in the prior art. U.S. Pat. No. 4,821,906 describes an ice cream cone guard for supporting an ice cream cone. Another type of cone holder is U.S. Pat. No. 3,481,458 describes a holder for holding sandwiches having a threaded handle at one end for raising and lowering the sandwich. U.S. Pat. No. 2,356,874 describes a dispensing container for dispensing tubes of creams. U.S. Pat. No. 5,979,695 describes an ice cream support container for enveloping an ice cream cone.

While these devices fulfill their respective, particular objectives and requirements, the need remains for a device that eliminates the mess involved in eating an ice cream cone.

SUMMARY OF THE INVENTION

The present invention meets the needs presented above by utilizing a peripheral ridge in the upper part of the opening to contain drips and a tip proof container that allows a user to set the ice cream cone down without the fear of it being tipped over.

Another object of the present invention is to provide a new cone holder that would provide the care provider ease of mind knowing that their child would be free of ice cream spills and drippings associated with eating an ice cream cone.

Still another object of the present invention is to provide a new cone holder that could easily be set on a support surface such as a countertop or table without the fear an ice cream cone therein being tipped over or spilled.

To this end, the present invention generally comprises a housing including a base and a vertical portion that is attached to and extends upwardly from the base. An opening extends into an upper end of the vertical portion and through a bottom surface of the base. A saddle is positioned in the opening and is frictionally coupled to an inner surface of the opening to selectively position the saddle in the opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
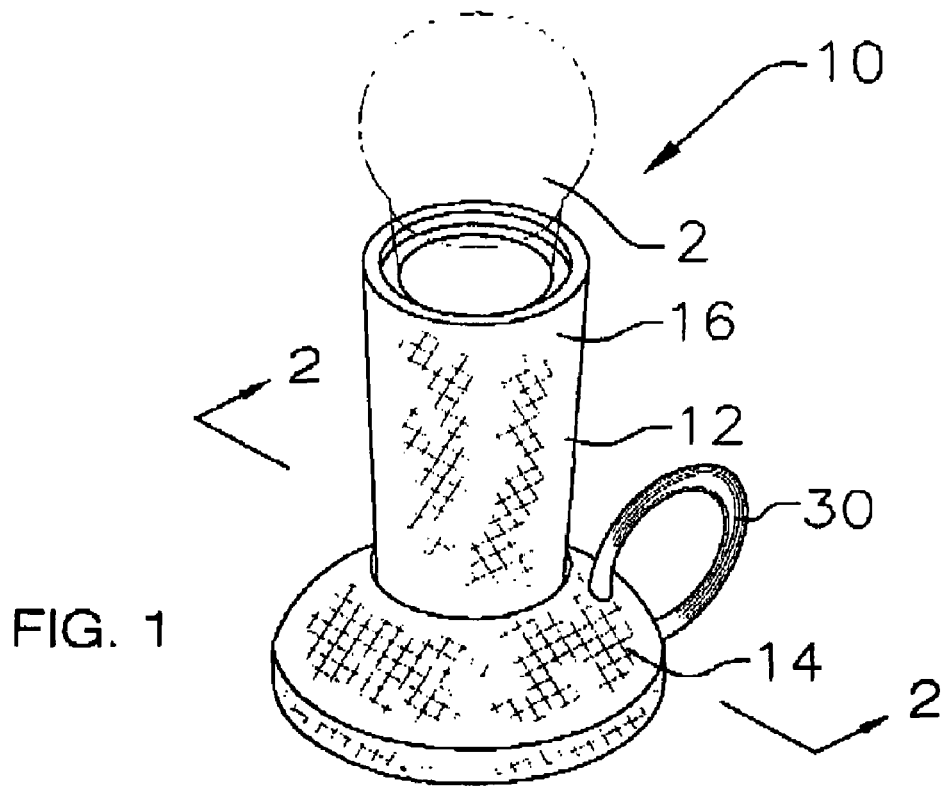
FIG. 1 is a perspective view of an ice cream cone holding apparatus according to the present invention.
Figure 2:
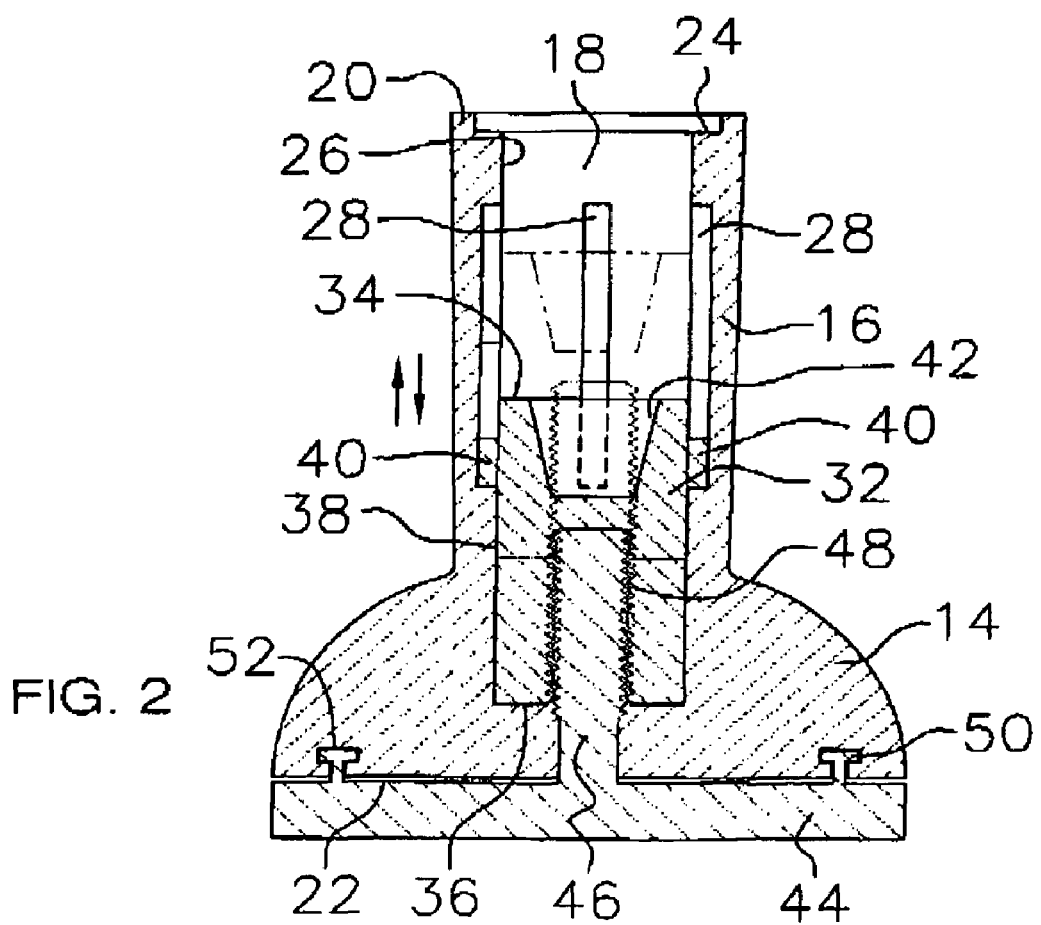
FIG. 2 is a cross-sectional view taken along the line 1—1 of FIG. 1 the present invention.
Figure 3:
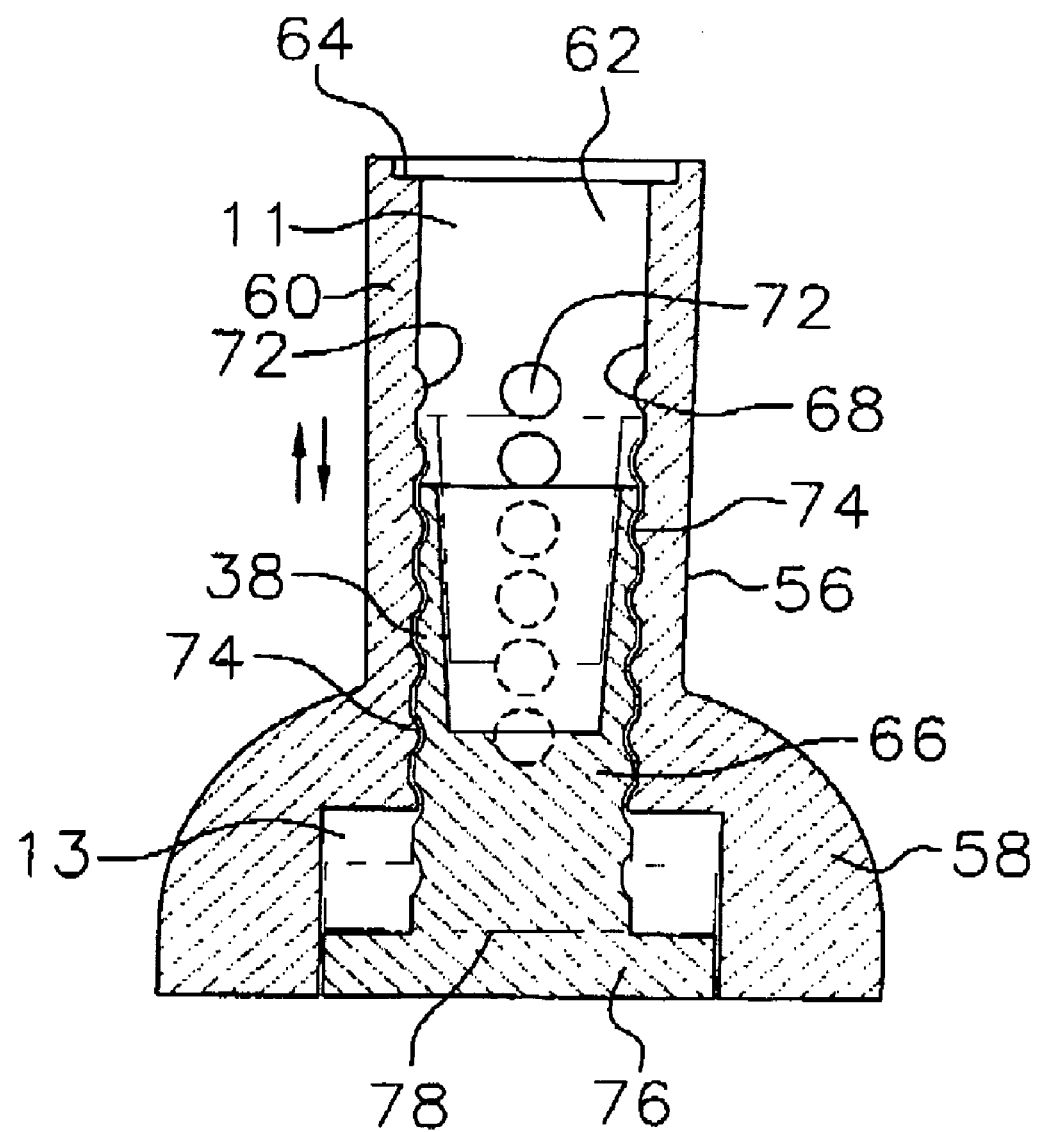
FIG. 3 is a cross-sectional view of a second embodiment of the present invention.

With reference now to the drawings, and in particular to FIGS. 1 through 3 thereof, a new cone holder embodying the principles and concepts of the present invention and generally designated by the reference numeral 10 will be described.

As best illustrated in FIGS. 1 and 2, a first embodiment of the ice cream cone holding apparatus 10 generally comprises a housing 12 including a base 14 and a vertical portion 16, which is attached to and extends upward from the base 14. An opening 18 extends into an upper end 20 of the vertical portion 16 and through a bottom surface 22 of the base 14. A peripheral ridge 24 extends along an inner surface 26 of the opening 18 and is positioned adjacent to the upper end 20. The inner surface 26 has a plurality of vertical slots 28 therein. A handle 30 is attached to the housing 12 and is preferably positioned on the base 14.

A saddle 32 is positioned in the opening 18. The saddle 32 has a top end 34, a bottom end 36 and a peripheral wall 38 extending between the top 34 and bottom 36 ends. A plurality of nubs 40 is attached to the peripheral wall 38. Each of the nubs 40 is positioned in one of the slots 28. The top end 34 has a depression 42 therein.

A plate 44 has a rod 46 attached thereto and extends upwardly therefrom. The rod 46 is threaded and is threadably engaged to a threaded receptacle 48 extending into the bottom end 36 of the saddle 32. The plate 44 is rotatably coupled to the bottom surface 22 of the base 14. This can be accomplished by a mating member 50 attached to the plate 44, which is mated with a receiving cavity 52 extending in a circle along the bottom surface 22 of the base 14. The saddle 32 is moved toward the upper end 20 of the housing 12 when the plate 44 is rotated in a first direction and toward the base 14 when the plate 44 is rotated in a second direction.

A second embodiment, depicted in FIG. 3, includes a housing 56 having a base 58 and a vertical portion 60 with an opening 62 and peripheral ridge 64 as in the first embodiment. However, the saddle 66 of the second embodiment is frictionally coupled to an inner surface 68 of the opening 62 to selectively position the saddle 66 in the opening 62. The inner surface 68 of the opening 62 of the second embodiment has a plurality of protuberances 72 vertically aligned in the opening 62 and the peripheral wall 38 of the saddle 66 has a plurality of horizontally orientated peripheral depressions 74 therein. The protuberances 72 frictionally engage the depressions 74 to selectively position the saddle 66 in the opening 70. Ideally, the second embodiment includes a flange 76 that is attached to the bottom end 78. The opening 70 has a top portion 11 and a bottom portion 13 wherein the bottom portion 13 has a greater diameter than the top portion 11. The flange 76 has an outer diameter smaller than the bottom portion 13 and greater than the top portion 11.

Preferably, for both embodiments, the outer surface of the housing 12,56 is textured and colored such that it resembles an ice cream cone. Also, preferably, both embodiments are comprised of a plastic material.

In use, the cone 2 is positioned in the opening 18 and into the depression in the saddle 32. In the first embodiment, the plate 44 is rotated to move the saddle 32 upward or downward to selectively move the cone 2 upward or downward. In the second embodiment, the movement of the cone is effected with the pushing of the saddle 66 upward with respect to the housing 56. When the user is finished with the cone 2, the saddle 32 is pushed back down so that the flange 76 is flush with the bottom surface 22 of the base 14. In both embodiments, the peripheral ridge 24,64 helps to retain any melted ice cream which would otherwise drip down the outside of the housing 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A holder for releasably holding an ice cream cone, said device comprising:

a housing including a base and a vertical portion being attached to and extending upward from said base, an opening extending into an upper end of said vertical portion and through a bottom surface or said base;

a saddle being positioned in said opening, said saddle having a top end, a bottom end and a peripheral wall extending between said top and bottom ends; and a plate having a rod attached thereto and extending upwardly therefrom, said rod being threaded, said rod being threadably engaged to a threaded receptacle extending into said bottom end of said saddle, a muting member being attached to said plate, said mating member extending into and being mated with a receiving cavity in said bottom surface of said base, said cavity extending in a circle about said base such that said plate is rotatably coupled to said base, wherein said saddle is moved toward said upper end of said housing when said plate is rotated in a first direction and toward said base when said plate is rotated in a second direction.

2. The holder as in claim 1, wherein further including a peripheral ridge extending along an inner surface of said opening and being positioned adjacent to said upper end.

3. The holder as in claim 1, wherein said opening has an inner surface having a plurality or vertical slots therein, a plurality of nubs being attached to said peripheral wall of said saddle, each of said nubs being positioned in one of said slots.

4. The holder as in claim 1, wherein said top end of said saddle has a depression therein.

5. The holder as in claim 1, further including a handle being attached to said housing, said handle being positioned on said base.

* * * * *